Feb. 14, 1933.   C. B. DEMPSTER ET AL   1,897,421
FURROW SEEDING MACHINE
Filed Oct. 25, 1929   3 Sheets-Sheet 1
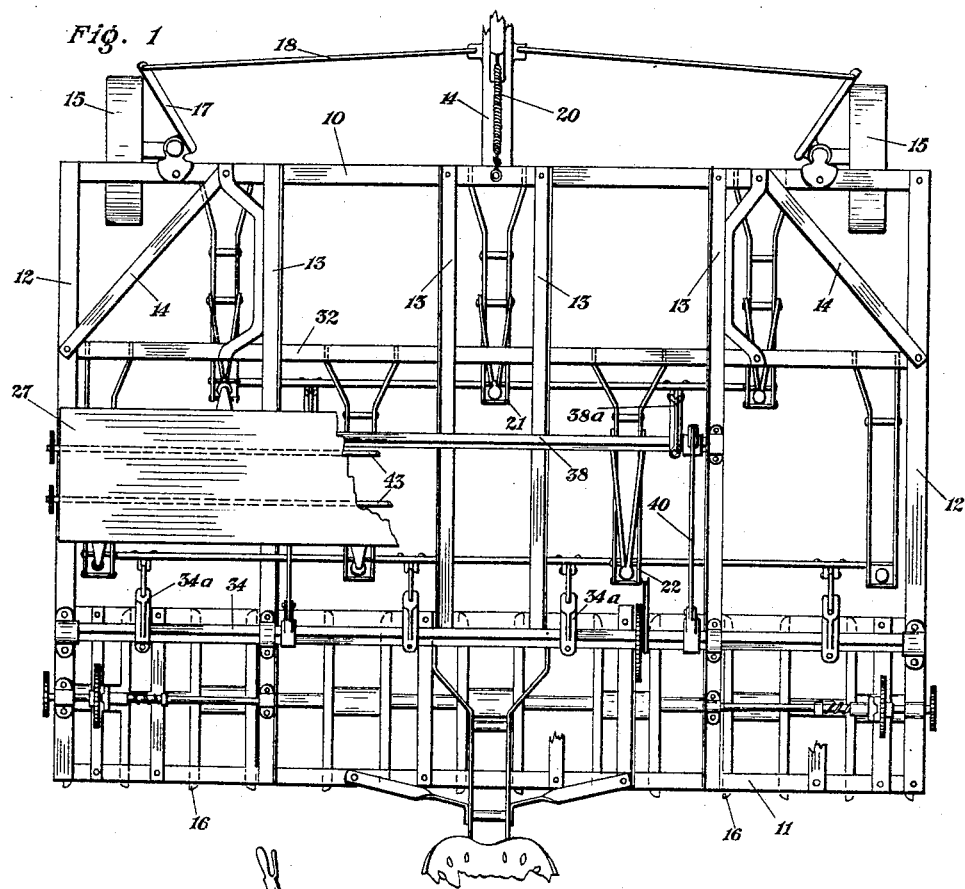
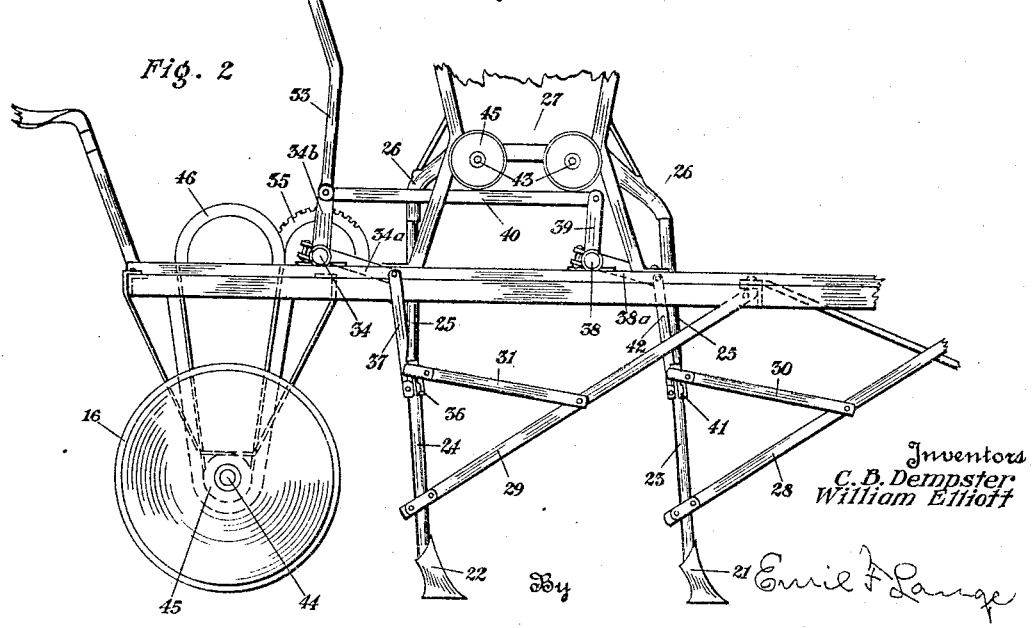
Inventors
C. B. Dempster
William Elliott
By Emil F. Lange
Attorney

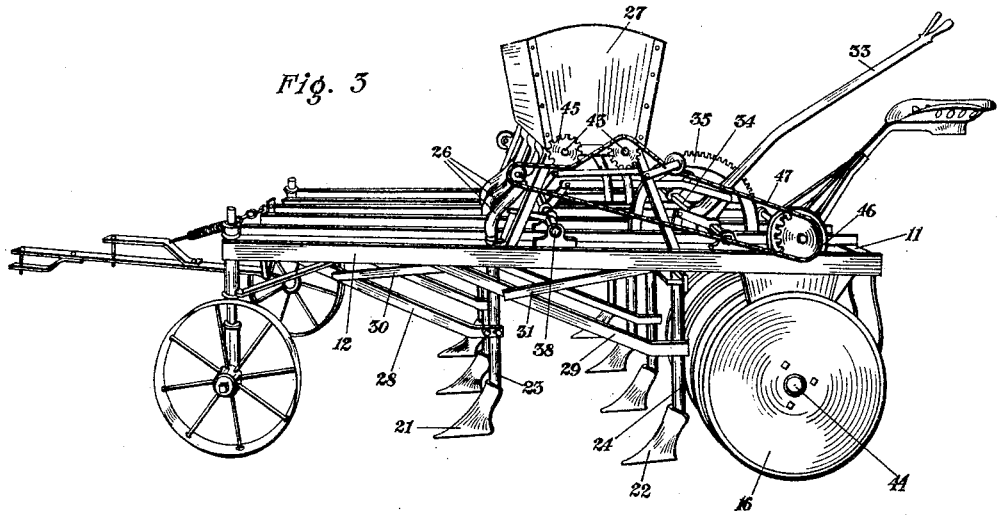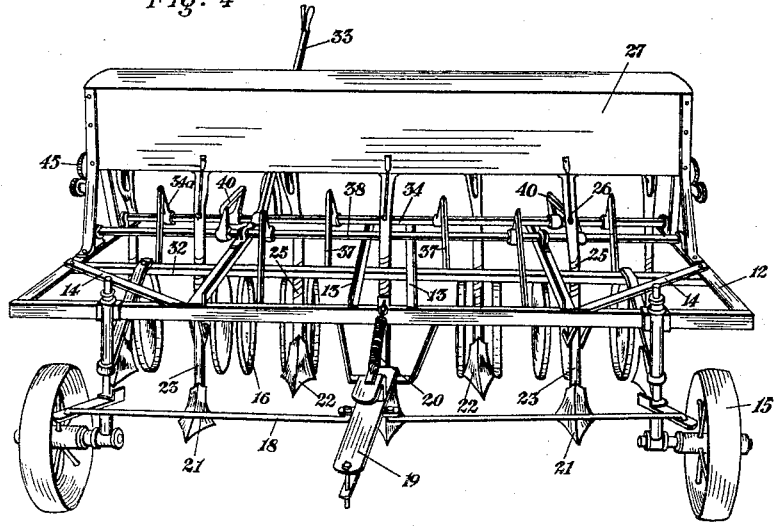

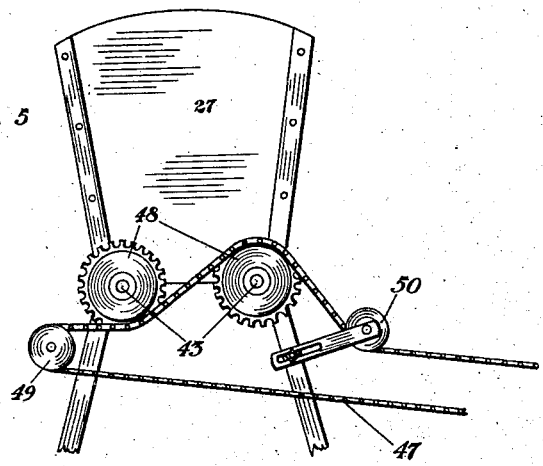
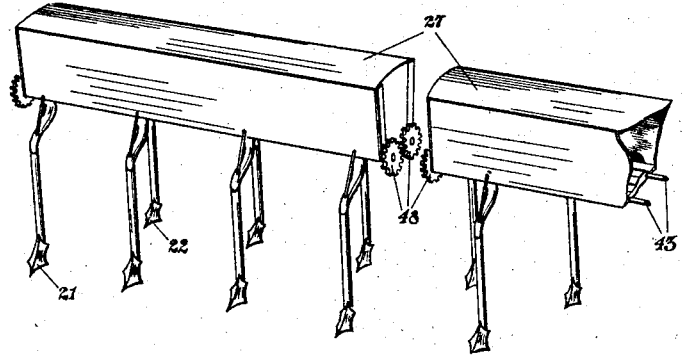
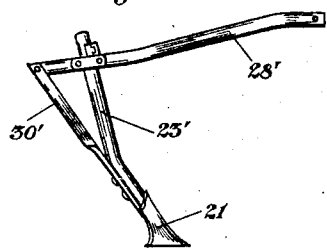

Patented Feb. 14, 1933

1,897,421

UNITED STATES PATENT OFFICE

CHARLES B. DEMPSTER AND WILLIAM ELLIOTT, OF BEATRICE, NEBRASKA, ASSIGNORS TO DEMPSTER MILL MANUFACTURING COMPANY, OF BEATRICE, NEBRASKA, A CORPORATION OF NEBRASKA

FURROW SEEDING MACHINE

Application filed October 25, 1929. Serial No. 402,522.

Our invention relates to furrow seeding machines and to a method of preparing the seed bed and for the planting of small grains.

A great majority of our small grains, particularly wheat, is grown in what might be called the semi-arid districts. Here the small grain is often planted in the stubble field of the previous crop.

The prior methods of preparing a seed bed for small grains fall generally into two classes. One of these comprises the plowing of the stubble field and then harrowing the surface of the plowed field either one or several times. By this method a smooth surface is left for the planter, although it requires the expenditure of much time.

The other method in general use entails the use of a disk plow which both turns and pulverizes the soil. This also is open to the same serious objection in that it necessitates the expenditure of much time and labor.

Because of the time required and consequent expense of the methods described, we have devised a method for expeditiously getting over the stubble field immediately after the crop is removed and for leaving the stubble field in the best possible condition for conserving the moisture and for receiving the seed, the field being also left in such a condition that drifting snow is retained on the field after seeding to still further add to the moisture on which the wheat depends.

We have also designed an implement for both quickly preparing the seed bed and sowing the seed without the use of other expensive farm equipment.

Briefly stated, our objects are the provision of a new method for tilling the soil and planting the grain and the provision of one implement for effectively and expeditiously carrying out these two objects and this method.

Figure 1 is a plan view of the implement, parts being broken away and other parts being omitted to more clearly disclose the structure underneath.

Figure 2 is a view in side elevation with certain parts omitted.

Figure 3 is a perspective view of the implement as viewed from the left-hand side.

Figure 4 is a front view in perspective of the furrow seeding machine.

Figure 5 is a view in end elevation of the seed box showing particularly the drive mechanism for the seed shafts.

Figure 6 is a perspective view of a seed box and of a portion of another seed box with their seed dropping mechanism, showing particularly the arrangement when two or more implements are used together in the field.

Figure 7 is a view in side elevation of a furrow opener and boot pipe and showing a modified form of drawbar and brace.

The frame of the implement has a front beam 10, a rear beam 11, and a pair of side beams 12, the beams forming a rectangular frame. This frame is braced by longitudinal braces 13 and also by other braces such as the diagonal braces 14. The frame is supported on a pair of front steering wheels 15 and on a plurality of press wheels 16. The press wheels have an important function in connection with the method of planting the seed and their structure and arrangement will be explained in connection with their function. The front steering wheels 15 are mounted on castor stems having guide arms 17 connected to guide rods 18, the inner ends of which are secured to the stub tongue 19. The guide wheels 15 will therefore move in unison with each other and with the stub tongue 19. The stub tongue is also provided with a counterbalancing spring 20.

The furrow openers 21 and 22 are arranged in front and rear transverse series and in staggered relation. The distance between two furrow openers is always uniform so that the furrows formed by the machine will not only be parallel to each other but so that they will be uniformly spaced. The furrow openers are secured to boot pipes 23 and 24 which connect with seed tubes 25 and thence through the seed tube holders 26 of the seed box 27. These members, however, do not constitute the support for the furrow openers 21 and 22. Since the functional relation of the furrow openers 21 and 22 to the soil is such that when the machine is in operation the thrust will be rearward and downward on the furrow openers, it is necessary that the furrow openers be provided with supports to resist the rearward and downward thrust. As shown in Figure 2, the boot pipes 23 and 24 are provided with drawbars 28 and 29 which are rigidly clamped to their boot pipes. They project forwardly and upwardly where they are pivotally secured to the frame of the machine. The pivotal connection of the drawbars 28 is in the front transverse beam 10 of the frame and the pivotal connection of the drawbars 29 is in the transverse brace 32 of the implement frame. These drawbars are further braced to the boot pipes by means of braces 30 and 31 which connect the drawbars to the boot pipes. The drawbars 28 and 29 are in the lines of draft of the furrow openers and they are amply braced against all normal thrusts which the furrow openers encounter in their movement through the soil.

Attention is directed to our special lister type furrow opener which cuts a perfectly flat surface on the solid moist ground on which the seed is dropped or broadcast. This furrow opener differs from most other tillage tools in that it turns the top soil out onto the ridges yet merely elevates the moist soil from the bottom of the furrow and allows it to fall back immediately onto the seed, thus planting on moist solid ground covered by moist soil.

The implement which we show in our drawings for purposes of illustration only includes seven furrow openers arranged in two series with four furrow openers in one series and three in the other. In our drawings the front series includes three furrow openers and the rear series includes four but the number may be changed to meet the wishes of the designer. The implement is so constructed that the furrow openers of the two series are interchangeable. In other words, it is possible to rearrange the furrow openers so that the front series will have four furrow openers and the rear series will have three. In any case where an odd number of furrow openers is used, the two furrow openers at the sides of the machine will be rather close to the edge. They are so spaced from the edge of the machine that when a second machine is linked at the side of the first, the end furrow openers of the contiguous sides of the two machines will be spaced the same distance as the distance between any two furrow openers of the single machine. It is desirable, especially when using the machine with tractors, to draw as many furrow forming machines as the tractor is capable of drawing. By thus operating a number of machines simultaneously, the ground can be covered very quickly and with very little expenditure of labor. The arrangement of the furrow openers as above described is designed to facilitate the use of alternate complementary machines of any number of machines within the capability of the tractor.

Means are provided for simultaneously raising and lowering all furrow openers. These means include a lever 33 which is rigidly secured to a rock shaft 34 journalled on the implement frame. The lever 33 for purposes of illustration as shown is manually operable and it cooperates in the usual manner with an arcuate rack 35. The boot pipes 24 are all connected to a transverse brace or lifting bar 36. The rock shaft 34 is provided with several clamp castings 34a each having a link 37 connected to the lifting bar. The actuation of the lever 33 will thus raise and lower the lifting bar 36 and with it all of the furrow openers 22. A second rock shaft 38 is journalled above the furrow openers 21. Secured to this rock shaft are levers 39 which are connected to the rock shaft 34 by means of clamp castings 34b through links 40 and are thus made operative by lever 33. The boot pipes 23 are connected together in spaced relation by means of a transverse brace and lifting bar 41 having links 42 projecting upwardly for connection with the levers 38a clamped to rock shaft 38. The actuation of the lever 33 thus rocks both rock shafts 34 and 38 through equal arcs and it simultaneously causes the lifting and the lowering of all the furrow openers 21 and 22.

In Figure 7 we have shown a somewhat modified form of drawbar. The furrow opener 21 is the same as in Figure 2. The boot pipe 23' instead of being straight is curved downwardly and forwardly. The drawbar 28' is clamped at an intermediate point of the drawbar to the boot pipe 23' so that a portion of the drawbar projects rearwardly. The drawbar 28' like the drawbars 28 and 29 is formed of two spaced beams as shown in Figure 1. The brace 30' is rigidly secured to the lower end portion of the boot pipe 23' and to the rear extremity of the drawbar 28'.

The seed box is designed to feed the seed both forwardly and rearwardly through the seed tube holders 26. The mechanism for actuating the feed shafts 43 is best shown in Figures 2 and 5, reference being also made to Figure 3. The special drawn bell type, trash proof press wheels 16 are secured to a shaft 44 having the sprocket wheel 45. This sprocket wheel 45 carries a chain for driving the sprocket wheel 46 which in turn drives the sprocket chain 47. The feed shafts 43 have sprocket wheels 48 with the chain 47 passing around the sprocket wheels 48 in the manner shown in Figure 5, passing under one of the sprocket wheels 48 and over the other in order to turn the feed shafts 43 in opposite directions. The frame of the machine is also provided with an idler 49 for the chain and also with a chain tightening idler 50.

After the grain from the previous crop has been removed from the field, the field should be worked in order to conserve the moisture in the ground at the time. This machine is admirably adapted for working the surface soil into ridges and furrows with all of the surface soil left in such condition as to prevent the escape by evaporation of the moisture in the soil as previously described. A single machine in which the seeding mechanism is made inoperative if desired will cover the field very rapidly and at a much lower labor cost compared to existing methods of soil conditioning. When tractors are available for drawing our seeding machine, it is desirable that as many as possible of our machines be linked together to be drawn by the same tractor. The labor cost is then spread over the entire gang and is no greater than it would be for a single unit. There is not only a saving in labor cost but also in gasoline when the tractor is worked to its full capacity.

The relationship between the furrow openers 21 and 22 has been explained. When the machines are equipped with an odd number of furrow openers and two or more machines are used with one source of power such as a large tractor, the furrow openers are simply rearranged so that alternate machines are complementary, as shown in Figure 6. In this way the contiguous furrows formed by two adjacent machines are parallel and spaced the same distance apart as any two adjacent furrows formed by a single machine. The seed box is provided with a plurality of fixed openings for feeding the grain through the boot pipes. When the implement is to be used in multiple for planting, the furrow openers 21 and 22 are interchanged and the seed box is reversed so that the outlets of the seed box will register with the feeding devices in their reversed position. In supplying complementary machines they are assembled in the reversed order so as to be ready for use without delay.

Our method of preparing the seed bed and planting the small grain is substantially as follows: Immediately after harvesting and before the ground becomes dried out, by means of our machine, we work the surface of the soil of the stubble field so as to leave alternate furrows and ridges. With our special type furrow opener part of the soil is thrown out onto the ridges and part is elevated by the furrow opening and falls back into the furrow. This leaves a loose mulch in the furrow and conserves the moisture. All of the weeds in the furrows are cut and those on the ridges are covered.

When seeding time comes we go over the field with the same machine. The front guiding wheels follow the furrows of the former operation and keep the special furrow openers positioned in the center of the ridges to break out the ridges forming furrows in their place and replacing the furrows with ridges, thus cutting and covering all of the ground. At the same time the seeding mechanism is operating and seed is planted under the best possible conditions. As before stated, the furrow opener which we employ turns the top or dryer soil out onto the ridges but merely elevates the moist soil from the bottom of the furrows and allows it to fall back immediately in its moist state onto the seed. The bottoms of the furrows are relatively wide and the seed is broadcast over the bottoms of the furrows. The furrow openers are followed by trash-proof press wheels for pressing down the moist covering soil in the furrows. By this method the seed is planted in the furrows where it is protected by the ridges and by all of the stubble and trash which are left on top of the ground to act as a mulch, all assisting in retaining the moisture in the soil and preventing soil blowing and protecting the grain from severe weather.

By the use of this method small grain may be seeded at a great saving over the former methods in use and in the semi-arid country it will produce a better crop.

Where it is desired, the seed bed may be prepared in the regular manner and our machine may be used only for seeding. Even under these conditions a marked saving in expense and increase in yield is noticeable.

We are aware that a somewhat similar method has been in use for the planting of corn wherein a lister cuts the soil into the form of ridges and furrows and then splits the ridges to drop the seed into the new furrows. Our method of planting small grain differs from the above method for planting corn in several important respects. By our method the ridges and furrows are relatively shallow and the furrows are relatively wide whereas in the method with listed corn the ridges and furrows are V-shaped and both are deep. In listing for corn, the implement used cuts a relatively deep gash and turns the soil completely over to form ridges. The top soil, which is usually dry, is thus turned into the bottom of the ridge while the moist soil is left on top of the ridge where it rapidly dries out. With our implement and by our method the soil is not turned over but it is elevated in such a way that the dryer soil is left on top of the ridges while the moist soil is caused to fall back in the rear of the furrow opener to cover the seed. In listing corn, the weeds and trash are completely covered and no new growth is permitted between the time of breaking the soil and the time of planting the corn. In this respect our method differs radically from that employed with corn. The stubble field after being worked with our implement is left with much of the stubble standing in a more or less tangled mass. At the time of planting the seed by the use of our machine all weeds and volunteer wheat are destroyed. The field has a ragged appearance due to the stubble and trash which is left on the surface of the field but which is firmly held by the top soil, helping to conserve the moisture and to prevent soil blowing. The ridges and furrows will retain the drifting snow and this is greatly facilitated by the mulch which is left on top of the soil. The mulch thus functions not only as a mulch and fertilizer but it very materially assists in retaining all of the snow which would otherwise blow over the field to form drifts in the rows. This feature is of prime importance in all regions in which the moisture falling during the growing season is insufficient for a full crop.

Having thus described our invention in such full, clear, and exact terms that its construction and operation will be readily understood by others skilled in the art to which it pertains, what we claim as new and desire to secure by Letters Patent of the United States is:

1. A furrow seeding machine, comprising a rigid main frame adapted to be assembled in transverse alignment with other like frames, vertically pivoted steering wheels mounted on the forward end of the frame to support it, pairs of spaced apart press wheels disposed in transverse alignment beneath the rear end of the frame, a seed box mounted across the frame between the front and rear ends thereof and having feed shafts with sprockets located at the opposite sides of the frame to register with corresponding shafts of adjacent frames, front and rear transverse rows of interchangeable furrow openers disposed respectively forwardly and rearwardly of the seed box on the frame and with the openers of one row staggered relatively to the openers of the other row and arranged in line with said press wheels, said furrow openers adapted for adjustment to usually space the same in aligned rows throughout adjacent frames when assembled, and seed conduits carried by the seed box for feeding seed through the furrow openers in both rows.

2. A furrow seeding machine, comprising a rigid main frame adapted to be assembled in transverse alignment with other like frames, vertically pivoted steering wheels mounted on the forward end of the frame to support it, pairs of spaced apart press wheels disposed in transverse alignment beneath the rear end of the frame, a seed box mounted across the frame between the front and rear ends thereof and having feed shafts with sprockets located at the opposite sides of the frame to register with corresponding shafts of adjacent frames, front and rear transverse rows of interchangeable furrow openers disposed respectively forwardly and rearwardly of the seed box on the frame and with the openers of one row staggered relatively to the openers of the other row and arranged in line with said press wheels, said furrow openers adapted for adjustment to equally space the same in aligned rows throughout adjacent frames when assembled, and seed conduits carried by the seed box for feding seed through the furrow openers in both rows, a rock shaft mounted on the frame for each row of furrow openers and connected thereto, and operating means connected to the rock shafts for simultaneously turning the same to elevate all of the furrow openers.

In testimony whereof we affix our signatures.

CHARLES B. DEMPSTER.
WILLIAM ELLIOTT.